(12) United States Patent
Prasadam et al.

(10) Patent No.: US 8,914,503 B2
(45) Date of Patent: Dec. 16, 2014

(54) DETECTED IP LINK AND CONNECTIVITY INFERENCE

(71) Applicant: Riverbed Technology, Inc., San Francisco, CA (US)

(72) Inventors: Sivaramakrishna Prasadam, Raleigh, NC (US); Raghavendra Uppalli, Cary, NC (US); James Mark Shaw, Cary, NC (US)

(73) Assignee: Riverbed Technology, Inc., San Francisco, CA (US)

( * ) Notice: Subject to any disclaimer, the term of this patent is extended or adjusted under 35 U.S.C. 154(b) by 83 days.

(21) Appl. No.: 13/654,859

(22) Filed: Oct. 18, 2012

(65) Prior Publication Data

US 2013/0124721 A1    May 16, 2013

Related U.S. Application Data

(60) Provisional application No. 61/559,917, filed on Nov. 15, 2011.

(51) Int. Cl.
  *G06F 15/173* (2006.01)
  *G06F 15/16* (2006.01)
  *H04L 12/24* (2006.01)
  *H04L 12/26* (2006.01)

(52) U.S. Cl.
  CPC ............ *H04L 43/0811* (2013.01); *H04L 41/12* (2013.01)

USPC .......... 709/224; 709/227; 709/215; 709/223; 709/226; 709/220; 370/217; 370/254; 370/256; 370/255; 370/400

(58) Field of Classification Search
  CPC ...................................................... H04L 41/12
  USPC ................. 709/224, 223, 226, 215, 220, 221
  See application file for complete search history.

(56) References Cited

U.S. PATENT DOCUMENTS

| | | | | |
|---|---|---|---|---|
| 6,501,761 | B1* | 12/2002 | Pannell et al. | 370/403 |
| 7,742,426 | B2* | 6/2010 | Schumacher et al. | 370/248 |
| 8,089,904 | B2* | 1/2012 | Balasubramaniam et al. | 370/254 |
| 2007/0147261 | A1* | 6/2007 | Schumacher et al. | 370/248 |
| 2009/0034540 | A1* | 2/2009 | Law | 370/400 |

* cited by examiner

*Primary Examiner* — Jude Jean Gilles

(74) *Attorney, Agent, or Firm* — Park, Vaughan, Fleming & Dowler LLP (57) ABSTRACT

Embodiments provide systems, methods, and computer program products for inferring the switch port connectivity of discovered but unmanaged devices in a network without direct access to the devices. Embodiments operate by generating a physical address-to-port map based on collected operational data and then pruning the generated map based on switch port connectivity information and/or inferred link connectivity information. The switch port connectivity of discovered unmanaged devices is then generated or updated based on the pruned map. The switch port connectivity information can be used by various other tools to enable diagramming, asset inventory, and network planning, design, and optimization workflows.

30 Claims, 5 Drawing Sheets

FIG. 5 ial Patent Application No. 61/559,917, filed on Nov. 15, 2011, which is incorporated herein by reference in its entirety.

DETECTED IP LINK AND CONNECTIVITY INFERENCE

CROSS-REFERENCE TO RELATED APPLICATIONS

The present application claims the benefit of U.S. Provisional Patent Application No. 61/559,917, filed on Nov. 15, 2011, which is incorporated herein by reference in its entirety.

BACKGROUND

1. Technical Field

The present disclosure relates generally to connectivity inference of detected Internet Protocol (IP) devices in a network.

2. Background Art

Commonly, network management systems discover unmanaged devices in the network. These devices, which are primarily host devices (e.g., end systems, servers, etc.), are typically not enabled for SNMP (Simple Network Management Protocol) or CLI (command line interface) access by the network management system. This makes it difficult for network management systems to identify the connectivity information of these devices, which is necessary to generate complete network diagrams or to perform modeling studies, for example. Additionally, if dynamic address assignment (e.g., Dynamic Host Configuration Protocol (DHCP)) is configured, the IP addresses of these unmanaged devices change regularly, further complicating the problem.

Accordingly, there is a need for methods, systems, and computer program products to determine the link and connectivity information of discovered unmanaged devices in a network.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For the purpose of this disclosure, the term "node" is used to refer to any network element, including routers, switches, bridges, terminals, hosts, etc. The term "switch" is used to refer to nodes that can be configured to receive packets or frames on one port (or interface) and selectively forward the packets or frames onto another port. As such, the term "switch" encompasses such elements as Layer-3 (L-3) switches, Layer-2 (L-2) switches, bridges, etc.

Figure 1:
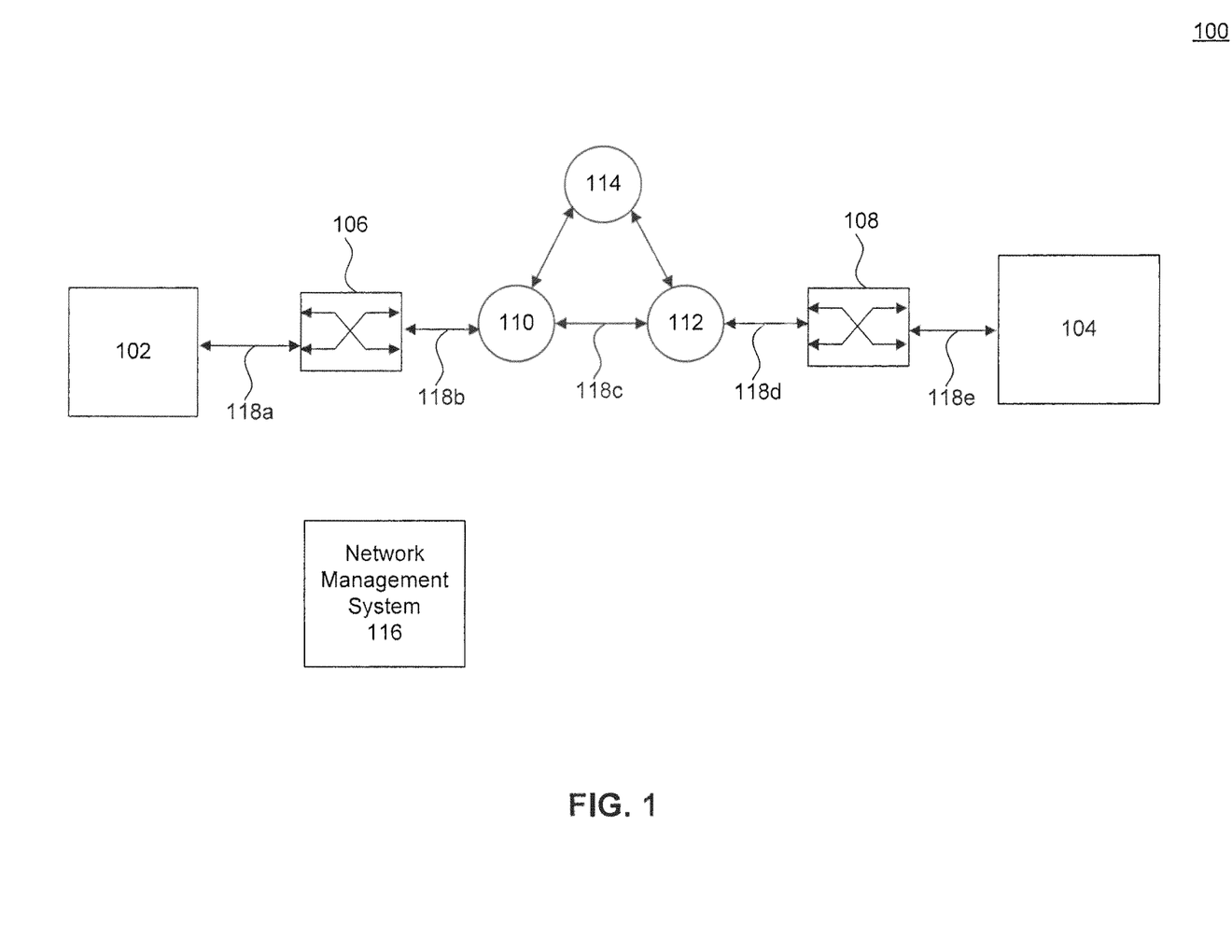
FIG. 1 illustrates an example network environment according to an embodiment.

FIG. 1 illustrates an example network environment 100 according to an embodiment of the present disclosure. Example network environment 100 is provided for the purpose of illustration and is not limiting of embodiments of the present disclosure. As shown in FIG. 1, example network environment 100 includes a plurality of network nodes 102, 104, 106, 108, 110, 112, and 114 and a network management system 116. As would be understood by a person of skill in the art based on the teachings herein, example network environment 100 may include more or less network nodes and/or elements than shown in FIG. 1.

In an embodiment, network nodes 102 and 104 are host devices which are in communication with each other. For example, network nodes 102 and 104 may be in communication to support a network application. The network application may be a client-server application or a peer-to-peer application. Communication between nodes 102 and 104 may be enabled by one or more intermediate nodes. For example, communication between nodes 102 and 104 may be enabled by nodes 106, 108, 110, and 112, which along with nodes 102 and 104 establish a communication path between nodes 102 and 104. In an embodiment, the communication path includes a plurality of connections 118a-e as shown in FIG. 1. Each connection 118a-e may include one or more data links and may include further network nodes.

The intermediate nodes between nodes 102 and 104 may include Layer-3 (L-3) and/or Layer-2 (L-2) devices. In the example of FIG. 1, nodes 110, 112, and 114 are L-3 devices, and nodes 106 and 108 are L-2 devices. L-3, or network layer, devices include devices such as routers and L-3 switches. L-3 devices perform packet routing based on maintained routing tables. Typically, a routing table at an L-3 device enables the device to map a packet's L-3 destination address to an outgoing interface on the device. In addition, L-3 devices may perform L-2 switching, as further described below. L-3 devices may further employ an L-3 to L-2 resolution protocol (e.g., Address Resolution Protocol (ARP)) to translate L-3 (e.g., IP) addresses to L-2 (e.g., Medium Access Protocol (MAC)) addresses, and may maintain ARP tables.

L-2, or data link layer, devices include devices such as L-2 switches and bridges. L-2 devices implement frame switching, whereby a data frame received by an ingress interface (incoming data port) is switched for transmission by an egress interface (outgoing data port) based on an L-2 forwarding table. For example, L-2 switching may rely on a MAC forwarding table (MAFT), which maps frame destination MAC addresses to outgoing data port numbers of the L-2 device. Typically, each ingress/egress interface has an associated MAC address. L-2 devices typically construct their respective L-2 forwarding tables based on source L-2 addresses contained in received frames (data or control frames).

According to embodiments, each of network nodes 102, 104, 106, 108, 110, 112, and 114 may or may not be part of a managed network, managed by network management system 116. Nodes that are part of the managed network are referred to herein as managed devices. Typically, network management system 116 has access privileges to managed devices. The access privileges allow network management system 116 to access, control, and execute network management processes from these devices, including accessing any routing tables, L3-to-L2 translation tables (e.g., ARP tables), and L-2 forwarding tables (e.g., MAFTs, CAMs, etc.) maintained at these devices.

In contrast, network management system 116 may not access nodes that are not part of the managed network. These nodes are referred to herein as unmanaged devices. For example, host devices 102 and 104 and node 114 may be unmanaged devices. Typically, for unmanaged devices, SNMP (Simple Network Management Protocol) or CLI (command line interface) access is not available to network management system 116.

However, network management system 116 may detect unmanaged devices based on operational data (e.g., data/control traffic, routing tables, L3-to-L2 translation tables, L-2 forwarding tables, etc.) collected from the managed portion of the network. Specifically, network management system 116 may be able to identify the IP address and the MAC address associated with some of these devices based on information contained in collected ARP tables, for example. For example, in a LAN environment, if an unmanaged device is connected (directly or indirectly) to a managed device that is reporting an ARP table (e.g., the unmanaged device's default router is a managed device that is reporting the ARP table), then the ARP table would contain the IP and MAC addresses of the unmanaged device. Optionally, if DNS (Domain Name System) is enabled, domain-name resolution lookups (nslookup) for the IP address of the unmanaged device can supply the name of the device. Additional information such as the operating system, operating system version, and device type can also be supplied by other agents such as NMap, for example. In the foregoing, these unmanaged but detected (IP and MAC addresses identified) devices are referred to as "detected IP devices" or "detected IPs." Often, detected IPs are host devices (e.g., end systems, servers, etc.). However, detected IPs are not limited to host devices and may include other device types.

Although network management system 116 may detect/discover detected IPs, network management system 116 has no direct access to information that provides the switch port connectivity of detected IPs (i.e., the switch ports that are directly connected to the detected IPs). This makes it difficult for network management system 116 to perform modeling studies, generate network diagrams, enable network planning and design, and execute optimization workflows, for example.

Embodiments of the present disclosure, as further described below, provide systems and methods for inferring detected IP connectivity without direct access to the detected IPs. An example network management system 200 with detected IP connectivity inference capability is provided in FIG. 2. Example system 200 is provided for the purpose of illustration only and is not limiting. As would be understood by a person of skill in the art based on the teachings herein, example system 200 may be implemented in a different manner and using different modules than shown in FIG. 2. Accordingly, embodiments are not limited by the structure shown in FIG. 2.

Figure 2:
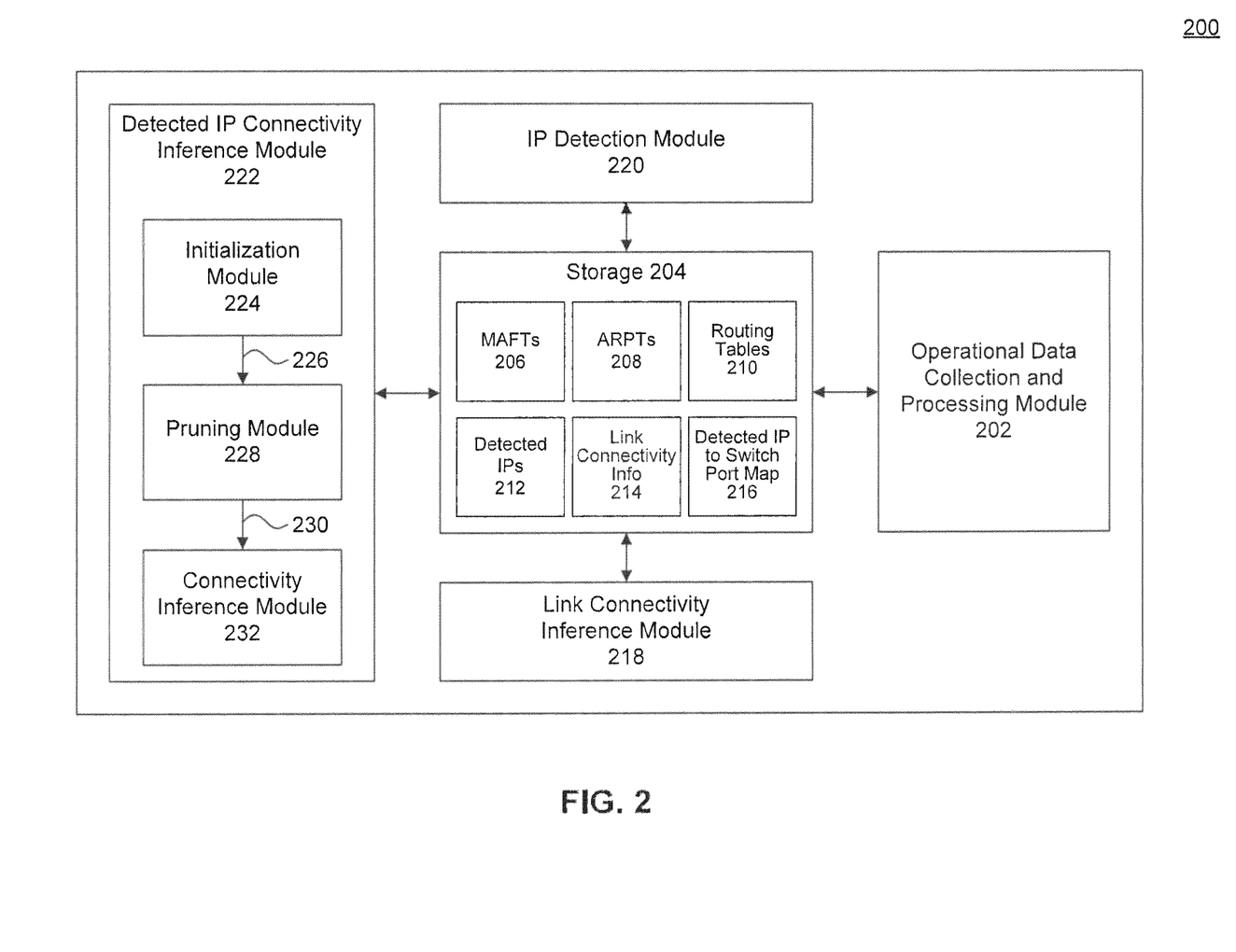
FIG. 2 illustrates an example network management system according to an embodiment.

As shown in FIG, 2, example network management system 200 includes an operational data collection and processing module 202, storage 204, a link connectivity inference module 218, an IP detection module 2.20, and a detected IP connectivity inference module 222. Storage 204 can be used to store a variety of data for supporting the functionality of network management system 200, including, without limitation, MAFTs 206, ARP tables 208, routing tables 210, detected IPs 212, link connectivity information 214, and a detected IP-to-switch port map 216, As further described below, some of the stored data is collected by network management system 200 from the network, while other portions are generated by network management system 200 based on collected data.

Operational data collection and processing module 202 is configured to collect operational data periodically or in response to a change from the network environment. As mentioned above, the data may be collected by accessing managed devices. Alternatively or additionally, managed devices report certain data periodically to module 202. Operational data may include, without limitation, data/control traffic, routing tables, L3-to-L-2 translation tables (e.g., ARP tables), and L-2 forwarding tables (e.g., MAFTs).

In an embodiment, module 202 Includes logic to process the operational data and to store it in storage 204 in one or more formats useable by link connectivity inference module 218, IP detection module 220. and detected IP connectivity inference module 222. Module 202 may also update the stored data as needed as additional data is collected and/or when certain data expires. As shown in FIG. 2, module 202 may store MAFTs 206, ARP tables 208, and routing tables 210 in storage 204.

Link connectivity inference module 218 is configured to execute a link connectivity inference algorithm using operational data stored in storage 204. The algorithm results in link connectivity information 214, which is stored in storage 204. Specifically, the link connectivity inference algorithm infers the presence of links in the network between managed devices. In an embodiment, the link connectivity inference runs periodically to update link connectivity information 214.

IP detection module 220 is configured to execute an algorithm for discovering detected IPs. The algorithm results in a listing of detected IPs 212, which is stored in storage 204. As described above, IP detection module 220 operates on collected operational data, including ARP tables, for example, to discover detected IPs (identifying their IP and MAC addresses) in the network. IP detection module 220 may also execute other functions such as DNS lookup, NMap, etc. to discover additional information regarding detected IPs, including the name of the detected IP device, operating system, operating system version, and device type. In an embodiment, IP detection module 220 periodically updates detected IPs 212.

Detected IP connectivity inference module 2.22 is configured to execute an algorithm for inferring detected IP connectivity. The algorithm, which is described further below with reference to FIGS. 3 and 4, results in a detected IP-to-switch port map 216, which is stored in storage 204. The detected IP-to-switch port map 216 indicates the switch port connectivity of each detected IP (identifies the switch and the switch port/interface directly connected to the detected IP) currently present in the listing 212 of detected IPs.

In an embodiment, as shown in FIG. 2, detected IP connectivity inference module 222 includes an initialization module 224, a pruning module 228, and a connectivity inference module 232. Initialization module 224 is configured to generate a physical address-to-port map 226 based on collected operational data stored in storage 204, and to provide the generated map 226 to pruning module 228.

In an embodiment, map 226 is a MAC address-to-port map, which associates with each known MAC address in the network the (managed) switch ports that are seeing this MAC address. By a switch port seeing a MAC address, it is meant the switch port has received a packet (traffic, control, data, etc.) sourced from the MAC address within a pre-defined time window in the past. In an embodiment, map 226 is generated by iterating over the MAFTs of all devices known to network management system 200, Typically, L-2 devices like switches are the type of devices that maintain MAFTs. Map 226 may thus include MAC address entries for routers, switches, hosts, etc. Some of these entries correspond to detected IPs.

Initially, it is assumed that each physical address in map 226 corresponds to a detected IP. Map 226 is then pruned by pruning module 228 to generate a pruned map 230. Specifically, pruning module 228 examines each switch port listed in map 226 to determine whether or not the switch port can possibly be directly connected to a detected IP. In an embodiment, pruning module 228 applies a set of heuristics, described further below with reference to FIGS. 3 and 4, to make this determination. If the switch port cannot possibly be connected to a detected IP, the switch port, is eliminated from map 226. If all switch ports associated with a physical address in map 226 are eliminated, the physical address entry itself is eliminated. Pruning module 228 may also prune map 226 by eliminating aggregate switch ports and/or any excess switch ports such that only one switch port is associated with each physical address in pruned map 230.

The pruned map 230 is then provided to connectivity inference module 232. which uses pruned map 230 to generate or update detected IP-to-switch port map 216 based on pruned map 230. The detected IP-to-switch port map 216 indicates the switch port connectivity of each detected IP (e.g., identifies the switch and the switch port/interface directly connected to the detected IP) currently present in the listing 212 of detected IPs.

Figure 3:
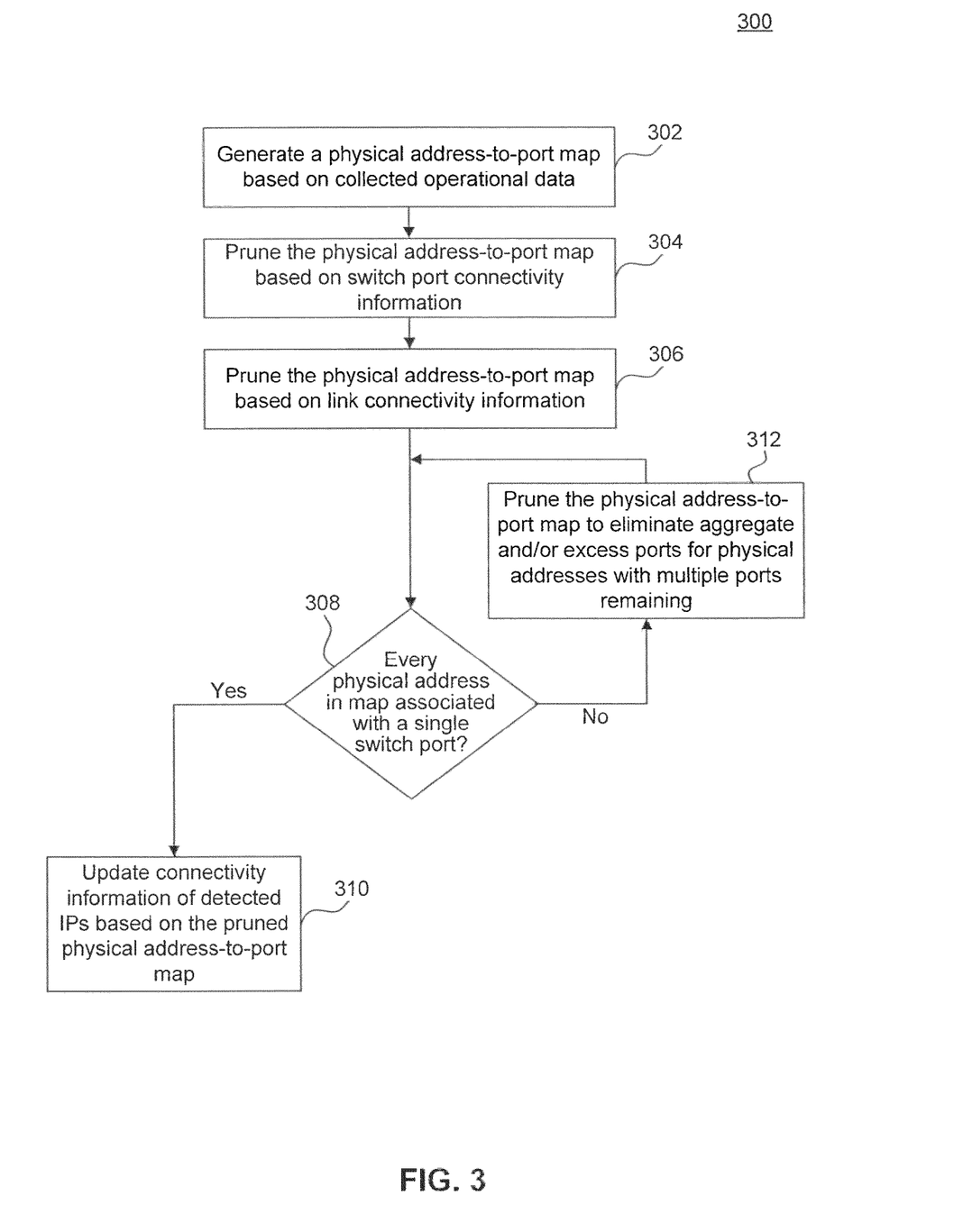
FIG. 3 is a flowchart of a process for determining connectivity information of detected Internet Protocol (IP) devices according to an embodiment.

FIG. 3 is a flowchart of an example process 300 for determining connectivity information of detected IP devices according to an embodiment. Example process 300 is provided for the purpose of illustration only and is not limiting. Example process 300 may be performed by a network management system, such as network management system 116 or 200 described above.

For the purpose of illustration and not limitation, example process 300 is described below with reference to FIG. 4, which shows an example network 400 including a router 402, a distribution switch D 404, an access switch A1 406, an access switch A2 408, and host devices H1 410, H2 412, H3 414, H4 416, and H5 418. For the purpose of illustration, it is assumed that host devices 410, 412, 414, 416, and 418 are detected IPs. Host devices 410, 412, 414, 416, and 418 are thus unmanaged devices and may not be accessed by the network management system. Host devices 410, 412, 414, 416, and 418 may have been discovered by the network management system from ARP tables maintained by router 402, for example. In contrast, router 402, distribution switch D 404, and access switches 406 and 408 are assumed to be managed devices.

Returning to FIG. 3, example process 300 begins in step 302, which includes generating a physical address-to-port map based on collected operational data. As described above in FIG. 2, step 302 may be performed by an initialization module such as initialization module 224, which processes available L-2 forwarding tables (e.g., MAFTs) to generate a physical address-to-port map.

The physical address-to-port map includes, for each physical address identified in the available L-2 forwarding tables (e.g. MAFTs), the switch ports or interfaces that see the physical address. In an embodiment, the network management has knowledge of the physical addresses of switch ports, and therefore initialization module 224 does not include entries for these physical addresses in the physical address-to-port map. By a switch port seeing a physical address, it is meant that the switch port has received a packet (traffic, control, data, etc.) sourced from the physical address within a pre-defined time window in the past. For example, referring to FIG. 4, if access switch 408 has received a packet sourced from H5 418 over switch port IF5 424, then the MAC address of host H5 418 is associated with switch port IF5 424 in the MAFT of access switch 408. IF5 424 is said to see the MAC address of host H5 418 and is thus associated with the entry corresponding to the MAC address of host H5 418 in the MAC address-to-port map. Similarly, if switch port IF1 420 of distribution switch 404 sees the MAC address of H5 418, then switch port IF1 420 is associated with, the entry corresponding to the MAC address of H5 418 in the MAC address-to-port map.

Returning to FIG. 3, after generating the physical address-to-port map, process 300 proceeds to steps 304 and 306, which include pruning the physical address-to-port map. In embodiments, steps 304 and 306 may or may not be. performed in the same order shown in FIG. 3. For example, step 306 may be performed before or at the same time as step 304. As described above, steps 304 and 306 may be performed by a pruning module such as pruning module 228 to generate a pruned physical address-to-port map. At each step (304 or 306), one or more switch ports may be eliminated from the physical address-to-port map.

Step 304 includes pruning the physical address-to-port map based on switch port connectivity information. Specifically, in an embodiment, step 304 includes examining each switch port listed in the physical address-to-port map to determine if the switch port sees a physical address of another switch port. If yes, then the switch port cannot possibly be directly connected to a detected IP, and the switch port is eliminated in the physical address-to-port map for each physical address entry with which it is associated.

Figure 4:
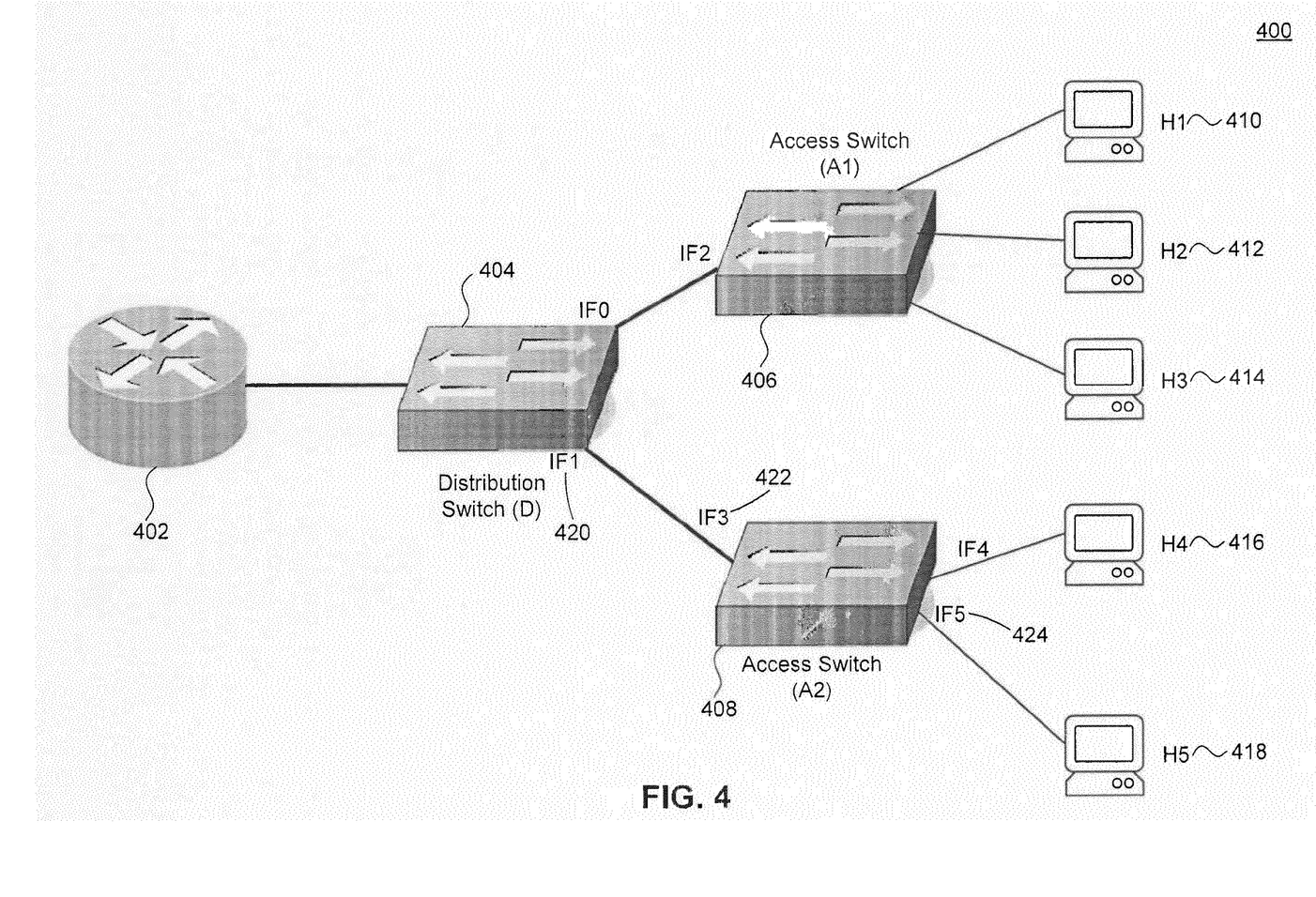
FIG. 4 illustrates an example network environment according to an embodiment.

For example, referring to FIG. 4, distribution switch D 404 is likely to see packets sourced from hosts H4 416 and H5 418 as a result of their communication with the outside world, e.g., browsing the Internet or accessing a device on another network. Distribution switch 404 is also likely to see control packets sourced from switch port IF3 422 of access switch A2 408 (A2-IF3 422), including, for example, spanning tree protocol (STP) messages, VTP (Virtual local area network (VLAN) Trunking Protocol) messages, keep-alive messages, etc. These packets are received over switch port IF1 420 of distribution switch D 404 (D-IF1 420), and thus switch port D-IF1 420 sees the MAC addresses of switch port A2-IF3 422 and of hosts H4 416 and H5 418. Because switch port D-IF1 420 sees the MAC address of another switch port (A2-IF3 422 in this case), then in most cases (as shown in FIG. 4) switch port D-IF1 420 cannot be directly connected to a detected IP (e.g., another switch sits between it and the detected IP) and it is eliminated from the physical address-to-port map.

Returning to FIG. 3, in another embodiment, step 304 further includes examining each switch port listed in the physical address-to-port map to determine if any other switch port sees its physical address. If yes, then the switch port is eliminated in the physical address-to-port map for each physical address entry with which it is associated. This step accounts for one-way visibility cases which may arise in the network. For example, referring to FIG. 4, a one-way visibility case may arise with D-IF1 420 not seeing the MAC address of A2-IF3 422 but A2-IF3 422 seeing the MAC address of D-IF1 420. Because D-IF1 420 does not see the MAC address of A2-IF3 422, the previously described elimination step would not eliminate D-IF1 420 from the physical address-to-port map. However, this step would ensure that D-IF1 420 is eliminated from the physical address-to-port map.

In an embodiment, step 304 depends on the knowledge of the network management system of the physical addresses of switch ports. In some embodiments, the physical addresses of some switch ports may be known to the network management system. For example, the network management system may know that a given device is a switch and may have access to the physical addresses of its switch ports. Alternatively or additionally, the network management system may infer whether a given port belongs to a switch (that the port is a switch port) by checking whether the port belongs to a device with MAFT data, whether the port has VLAN, STP, or switch-port configuration data, and/or whether the port belongs to a device with an attribute set that indicates that the device is a switch.

Step 306 includes pruning the physical address-to-port map based on link connectivity information. Specifically, step 306 includes eliminating from the physical address-to-port map every switch port known to have a link that terminates on (directly linked to) another switch port/interface. In an embodiment, the link connectivity information of switch ports is provided by a link connectivity inference algorithm of the network management system. In an embodiment, the link connectivity inference algorithm implements an algorithm as described in U.S. Pat. No. 8,089,904, titled "Link Inference in Large Networks Based on Incomplete Data," which is incorporated by reference herein in its entirety. For example, referring to FIG. 2, network management system 200 includes a link connectivity inference module 218, which generates link connectivity information 214. Link connectivity information 214 includes network links inferred from collected operational data.

Step 306 aids in situations where the network management system may not have historically correct information for all L-2 forwarding tables (e.g., MAFTs) resulting in multiple port candidates for a detected IP. For example, referring to FIG. 4, assuming that D-IF1 420 does not see the MAC address of A2-IF3 422 (and that A2-IF3 422 also does not see the MAC address of D-IF1 420), then two or more potential candidates may exist for the port directly connected to hosts H5 418. Specifically, any time H5 418 communicates with the outside world, its MAC address is registered as associated with both A2-IF5 424 and D-IF1 420. Because D-IF1 420 and A2-IF3 422 do not see each other's MAC address, neither of the two elimination conditions of step 304 above are satisfied with respect to D-IF1 420, and D-IF1 420 is not eliminated as a potential switch port candidate for H5 418. Step 306 aids in such scenarios by using the knowledge of the existence of a link between D-IF1 420 and switch port A2-IF3 422 (inferred by the link inference algorithm) to eliminate switch port D-IF1 420, leaving A2-IF5 424 as the sole switch port for host H5 418. Similarly, the same information can be used to eliminate switch port A2-IF3 422 because it also has a link that terminates on another switch port (D-IF1 420).

At the end of step 306, each physical address in the physical address-to-port map should have a single port associated with it. This condition is checked in step 308, and if not met then process 300 proceeds to step 312, which includes pruning the physical address-to-port map to eliminate aggregate ports and/or excess ports for physical addresses with multiple ports remaining. Aggregate ports are ports that are grouped or bundled together at the logical level to produce a larger bandwidth link, if, after eliminating aggregate ports, a physical address still has more than one port associated with it, then the port with the lowest age in the corresponding MAFT (most recent) is selected. Subsequently, if there are still multiple ports associated with a physical address, then one of the remaining ports is selected and the other excess ports are eliminated. For example, the remaining ports are sorted in alphabetical order and only the first port in the sorted order is maintained in the physical address-to-port map Following step 312, process 300 returns to step 308, where the single switch port per physical address condition is satisfied, and then to step 310. Step 310 includes updating the connectivity information of detected IPs based on the pruned physical address-to-port map resulting from steps 304, 306, and/or 308. In an embodiment, step 310 may be performed by a connectivity inference module, such as connectivity inference module 232, of the network management system.

In an embodiment, step 310 includes comparing the physical address of each known detected IP against the pruned physical address-to-port map. If the physical address of the detected IP matches a physical address entry of the pruned map, then the switch port information associated with that entry is used to generate or update the switch port connectivity information for the detected IP. At the end of step 310, a detected IP to switch port map may be generated, as described above with reference to FIG. 2.

Figure 5:
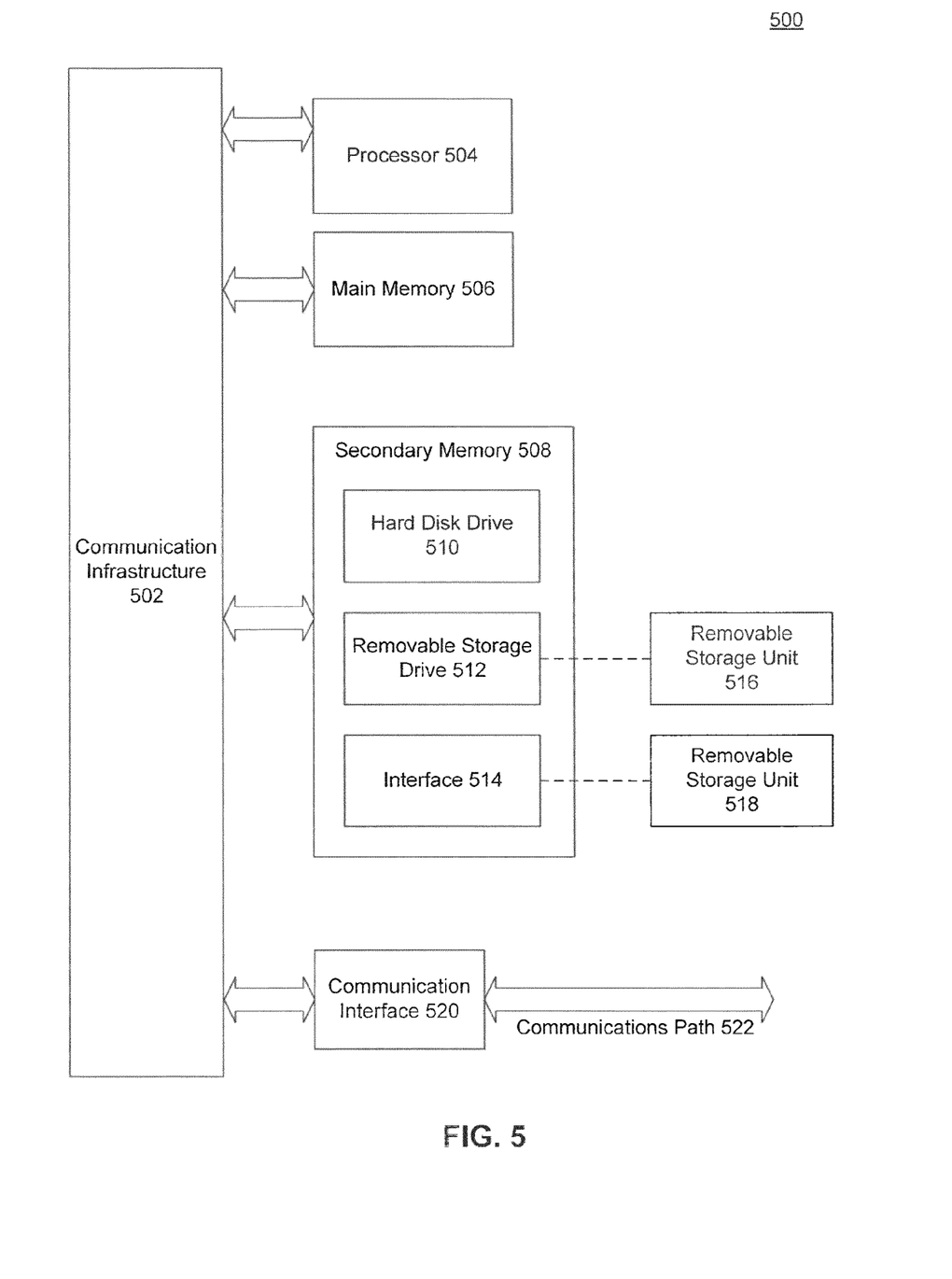
FIG. 5 illustrates an example computer system that can be used to implement aspects of embodiments.

Embodiments of the present disclosure can be implemented in hardware, software or as a combination of software and hardware. Consequently, embodiments of the disclosure may be implemented in the environment of a computer system or other processing system. An example of such a computer system 500 is shown in FIG. 5. Embodiments described in FIGS. 1, 2, and 4 may execute on one or more computer systems 500. Furthermore, each of the steps of the processes depicted in FIG. 3 can be implemented on one or more computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable-storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals winch may be electronic, electromagnetic, optical, or other signals capable of being received by communications interface 520. These signals are provided to communications interface 520 via a communications path 522. Communications path 522 carries signals and may be Implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk Installed In hard disk drive 51.0. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded, into computer system 500 using removable storage drive 512, interface 514, or communications interface 520.

In another embodiment, features of the disclosure are implemented primarily in hardware using, for example, hardware components wets as application-specific integrated circuits (ASICs) and gate arrays. Implementation of a hardware state, machine so as to perform the functions described herein will also be apparent, to persons skilled in the relevant art(s).

Embodiments have been described above with the aid td functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for determining connectivity information of detected Internet Protocol (IP) devices in a network, comprising:
generating a physical address-to-port map based on collected operational data;
pruning the physical address-to-port map to generate a pruned physical address-to-port map, wherein said pruning comprises pruning the physical address-to-port map based on switch port connectivity Information and link connectivity information; and
updating connectivity information of the detected IP devices based on the pruned physical address-to-port map.

2. The method of claim 1, further comprising:
identifying the detected IP devices based on the collected operational data.

3. The method of claim 1, wherein the collected operational data comprises one or more of data/control traffic, routing tables, Layer-3 (L-3)-to-Layer-2 (L-2) translation tables, and L-2 forwarding tables.

4. The method of claim 1, wherein generating the physical address-to-port map comprises processing a Layer-2 (L-2) forwarding table to determine for each physical address identified in the L-2 forwarding table a switch port that sees the physical address.

5. The method of claim 1, wherein the physical address-to-port map associates with a physical address one or more switch ports that see the physical address.

6. The method of claim 5, wherein pruning the physical address-to-port map based on switch port connectivity information comprises, for each switch port listed in the physical address-to-port map:
determining if the switch port sees a physical address of another switch port; and
if the switch port sees the physical address of the another switch, eliminating the switch port from the physical address-to-port map for every associated physical address.

7. The method of claim 5, wherein pruning the physical address-to-port map based on switch connectivity information comprises, for each switch port listed in the physical address-to-port map:
determining if another switch port sees a physical address of the switch port; and
if another switch port sees the physical address of the switch port, eliminating the switch port from the physical address-to-port map for every associated physical address.

8. The method of claim 5, wherein pinning the physical address-to-port map based on link connectivity information comprises, for each switch port listed in the physical address-to-port map:
determining if the switch port is directly linked to another switch port; and
if the switch is directly linked to another switch port, eliminating the switch port from the physical address-to-port map for every associated physical address.

9. The method of claim 1, further comprising:
eliminating aggregate ports for at least one physical address entry of the pruned physical address-to-port map.

10. The method of claim 1, further comprising, for each physical address of the pruned physical address-to-port map with more than one remaining associated switch ports:
sorting the remaining switch ports associated with the physical address; and selecting a switch port from the remaining switch ports based on the sorting; and eliminating switch ports other than the selected switch port from the pruned physical address-to-port map.

11. The method of claim 1, wherein updating the connectivity information of the detected IP devices based on the pruned physical address-to-port map comprises, for each detected IP device:

determining a physical address entry of the pruned physical address-to-port map that matches a physical address of the detected IP device; and updating switch port connectivity information of the detected IP device using switch port information associated with the matching physical address entry of the pruned physical address-to-port map.

12. The method of claim 1, wherein updating the connectivity information of the detected IP devices based on the pruned physical address-to-port map comprises:

generating a detected IP device-to-switch port map based on the pruned physical address-to-port map.

13. The method of claim 1, wherein the detected IP devices are unmanaged devices in the network.

14. The method of claim 1, wherein the physical address-to-port map is a Medium Access Control (MAC) address-to-port map.

15. A network management system for determining connectivity information of detected Internet Protocol (IP) devices in a network, comprising:

an initialization module configured to generate a physical address-to-port map based on collected operational data;

a pruning module configured to prune the physical address-to-port map based on switch port connectivity information and link connectivity information to generate a pruned physical address-to-port map; and a connectivity inference module configured to update connectivity information of the detected IP devices based on the pruned physical address-to-port map.

16. The system of claim 15, further comprising:

an IP detection module configured to identify the detected IP devices based on the collected operational data.

17. The system of claim 15, further comprising:

storage configured to store the collected operational data, wherein the collected operational data comprises one or more of data/control traffic, routing tables, Layer-3 (L-3)-to-Layer-2 (L-2) translation tables, and L-2 forwarding tables.

18. The system of claim 15, wherein the physical address-to-port map associates with a physical address one or more switch ports that see the physical address.

19. The system of claim 18, wherein the pruning module is further configured to, for each switch port listed in the physical address-to-port map:

determine if the switch port sees a physical address of another switch port; and if the switch port sees the physical address of the another switch, eliminate the switch port from the physical address-to-port map for every associated physical address.

20. The system of claim 18, wherein the pruning module is further configured to, for each switch port listed in the physical address-to-port map:

determine if another switch port sees a physical address of the switch port; and if another switch port sees the physical address of the switch port, eliminate the switch port from the physical address-to-port map for every associated physical address.

21. The system of claim 18, wherein the pruning module is further configured to, for each switch port listed in the physical address-to-port map:

determine if the switch port is directly linked to another switch port; and if the switch is directly linked to another switch port, eliminate the switch port from the physical address-to-port map for every associated physical address.

22. The system of claim 15, wherein the connectivity inference module Is further configured to, for each detected IP device:

determine a physical address entry of the pruned physical address-to-port map that matches a physical address of the detected IP device; and update switch port connectivity information of the detected IP device using switch port information associated with the matching physical address entry of the pruned physical address-to-port map.

23. A method .for determining connectivity information of detected Internet Protocol (IP) devices in a network, comprising:

generating a physical address-to-port map based on collected operational data;

pruning the physical address-to-port map to generate a pruned physical address-to-port map, wherein said pruning comprises pruning the physical address-to-port map based on at least one of switch port connectivity information and link connectivity information; and updating connectivity information of the detected IP devices based on the pruned physical address-to-port map.

24. The method of claim 23, wherein the switch port connectivity information includes information regarding physical addresses seen by switch ports in the network.

25. The method of claim 23, wherein the link connectivity information includes information regarding inferred links in the network.

26. A non-transitory computer-readable storage medium having control logic recorded thereon that, when executed by a processor, causes the processor to perform a method for determining connectivity information of detected Internet Protocol (IP) devices in a network, the method comprising:

generating a physical address-to-port map based on collected operational data;

pruning the physical address-to-port map to generate a pruned physical address-to-port map, wherein said pruning comprises pruning the physical address-to-port map based on switch port connectivity information and link connectivity information; and updating connectivity information of the detected IP devices based on the pruned physical address-to-port map.

27. The non-transitory computer-readable medium of claim 26, wherein pruning the physical address-to-port map based on switch port connectivity information comprises, for each switch port listed in the physical address-to-port map:

determining if the switch port sees a physical address of another switch port; and if the switch port sees the physical address of the another switch, eliminating the switch port from the physical address-to-port map for every associated physical address.

28. The non-transitory computer-readable medium of claim 26, wherein pruning the physical address-to-port map based on switch connectivity information comprises, for each switch port listed in the physical address-to-port map:

determining if another switch port sees a physical address of the switch port; and if another switch port sees the physical address of the switch port, eliminating the switch port from the physical address-to-port map for every associated physical address.

29. The non-transitory computer-readable medium of claim 26, wherein pruning the physical address-to-port map based on link connectivity information comprises, for each switch port listed in the physical address-to-port map:

determining if the switch port is directly linked to another switch port; and if the switch is directly linked to another switch port, eliminating the switch port from the physical address-to-port map for every associated physical address.

30. The non-transitory computer-readable medium of claim 26, wherein updating the connectivity information of the detected IP devices based on the pruned physical address-to-port map comprises, for each detected IP device:

determining a physical address entry of the pruned physical address-to-port map that matches a physical address of the detected IP device; and updating switch port connectivity information of the detected IP device using switch port information associated with the matching physical address entry of the pruned physical address-to-port map.

\* \* \* \* \*